Feb. 16, 1943.  G. SLAYTER  2,311,613
TRANSPARENT COMPOSITE MATERIALS
Filed April 11, 1939
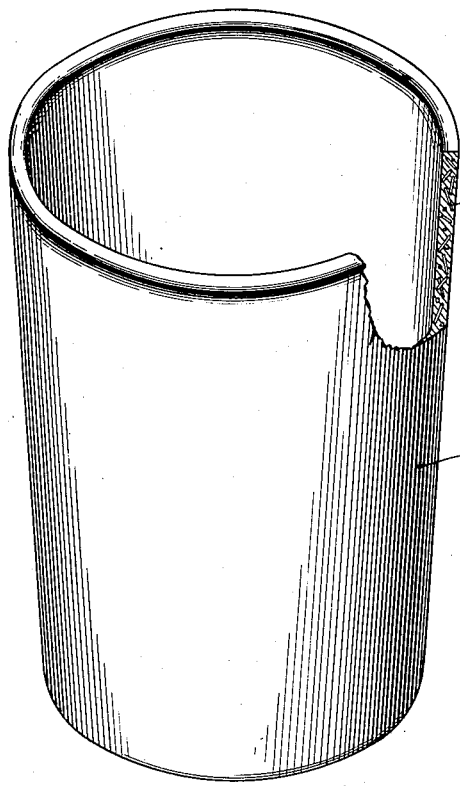
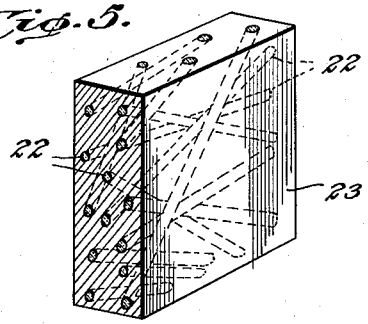
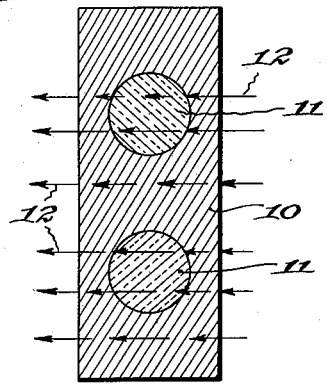
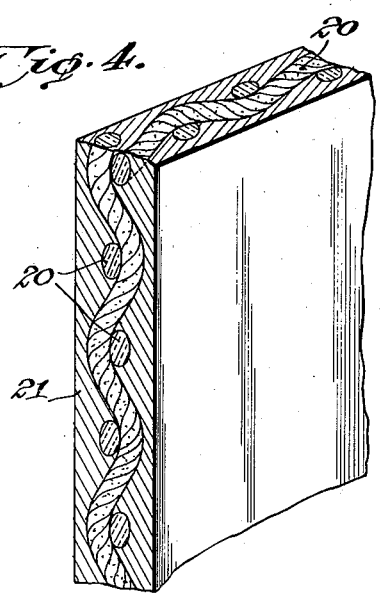
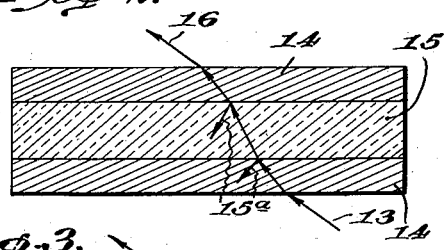
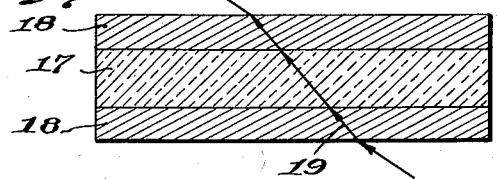
INVENTOR.
Games Slayter,
BY Carl G. Staelin
ATTORNEY Patented Feb. 16, 1943

2,311,613

UNITED STATES PATENT OFFICE 2,311,613

TRANSPARENT COMPOSITE MATERIAL

Games Slayter, Newark, Ohio, assignor to Owens-Corning Fiberglas Corporation, a corporation of Delaware Application April 11, 1939, Serial No. 267,245

8 Claims. (Cl. 117—126)

My invention relates to composite materials and articles which comprise a base consisting of an organic plastic or other material, and a reinforcing material in fibrous or other segregated or discrete form embedded in said base. A preferred form of the invention comprises a base of transparent material and a different transparent material in fibrous form embedded in said base, said materials having the same index of refraction so that the embedded material is invisible, the composite material being clear and transparent.

An object of the invention is to provide a composite material of the character indicated comprising an organic plastic having glass in fibrous form embedded therein.

A further object of the invention is to provide a composite material comprising a plastic base having fine glass fibers embedded therein in such manner as to add strength and toughness to the said plastic, prevent shattering, and provide a binder and filler for the plastic.

A further object of the invention is to provide a transparent composite substance combining a transparent base material with a transparent reinforcing material having the same refractive index embedded therein in a manner to render the reinforcing material optically invisible.

A further specific object of the invention is to provide a transparent organic plastic with an inorganic reinforcing material such as fine glass fibers embedded therein, the relative indexes of refraction of the materials being such that the embedded fibers are invisible.

Other objects of the invention will appear hereinafter.

The present application discloses certain subject matter also disclosed in my copending application, Serial Number 56,965, filed December 31, 1935, for Combined glass fibers with plastics, and is in part a continuation of said copending application as to all such subject matter.

Referring to the accompanying drawing:

Fig. 1 is a diagrammatic cross-sectional view of a plastic material having fibers of glass or the like embedded therein;

Figs. 2 and 3 are similar views but with the sections extending lengthwise of the fibers, illustrating light refractions as produced by different materials;

Fig. 4 is a fragmentary perspective view illustrating a fabric made of glass fibers or the like and having a binder and covering of plastic material;

Fig. 5 is a similar view showing a plastic having fibers of glass or the like dispersed therethrough; and Fig. 6 is a perspective view partly broken away showing a transparent tumbler made of composite material.

I have found that plastic materials, including organic plastics generally, may be combined with a reinforcing material such as fine glass fibers, the reinforcing material being embedded in the plastic body or interspersed throughout said body, in a manner to greatly improve the qualities of the plastic material, adding greatly to the tensile strength, toughness, wearing qualities and otherwise improving such material.

I have found that glass wool comprising long, attenuated glass fibers of extremely small diameter and simulating cotton in appearance, is well adapted for incorporation in a base of plastic material for strengthening said material and improving its properties in various ways.

I have further found that fabricated materials made of such fine glass fibers may be embedded in a plastic substance or coated with such a substance in a manner to prevent frictional contact or rubbing between the fibers and to hold the fibers in proper relative positions without destroying their flexibility and other desirable properties. When glass fibers are used as a reinforcing material, they may be of a fineness ranging, for example, from two or three microns to ten microns in diameter. These fibers may be produced by any approved method and apparatus, as, for example, the method disclosed in the patent to Slayter and Thomas, 2,133,236, granted October 11, 1938. Where the embedded fibers are in the form of yarns, woven textiles or other fabricated forms, the fabrication may be effected in the manner disclosed in the Slayter and Thomas patent, 2,133,238, granted October 11, 1938.

I have found that transparent materials such as glass fibers may be embedded in a transparent plastic or combined therewith in such a manner that the embedded material optically disappears. In order to obtain this result, the indices of refraction of the materials must be substantially equal. If the indices of refraction are materially different, the embedded fibers radiate and diffuse light so that they are plainly seen, whereas if the indices of refraction are substantially the same, the embedded glass is invisible so that the composite mass has the appearance of being a solid transparent homogeneous substance.

In Fig. 1 I have illustrated diagrammatically a plastic material 10 which may consist of any suitable transparent resin or other material, having glass fibers 11 (greatly magnified) or similar transparent material embedded in the plastic base 10. Since the indices of refraction are identical for the two materials, light rays 12 will pass through both the materials without being refracted at the contacting surfaces of the two materials. The fibers thus remain invisible.

Fig. 2, on the other hand, illustrates the effect of a beam of light traveling through a combination of transparent substances having different indices of refraction. As the light ray 13 enters the plastic 14, it is slightly deflected toward the normal and then as it enters the glass fibers 15 (greatly magnified), it is again deflected in accordance with the difference in the indices of refraction. In addition, numerous independent reflections 15ᵃ are thrown back by the material having a different index of refraction. In passing out of the glass fiber 15, the light ray is deflected back into its original direction through the plastic 14 and then in emerging from the plastic, the light ray is once more deflected to its original direction through the atmosphere. Thus when light rays are directed to and through irregularly shaped bodies embedded within a transparent material having a different index of refraction, the light is broken up and diffused into may foreign refractions and reflections. This may destroy the transparency so that it is impossible to see through such material.

In ordinary laminated flat plates of glass and plastics, the problem of different indices of refraction generally does not arise since the rays 13 and 16 (Fig. 2) are substantially parallel. However, when fibrous glass is embedded in a transparent plastic having a different index of refraction, the curved surfaces of the fibers bend the rays in different directions and cause numerous dispersed reflections so that as light rays are passed through the material, they are radiated in different directions and the light thus diffused. Such diffusion of the light may render the embedded fibers clearly visible or the diffusion may be of such extent and character that the otherwise transparent plastic base is rendered entirely non-transparent.

In Fig. 3 a glass fiber 17 is shown embedded in the plastic material 18 having substantially the same index of refraction so that the light ray 19 in passing from one surface of the plastic to the other is not deflected but maintains a straight line path. By using fibers of the same refractive index as the plastic, it is possible in this manner to produce a transparent plastic reinforced by a skeleton or network of strengthening fibers which may be more or less irregular and which are optically invisible.

My invention contemplates the manufacture of a substitute for ordinary sheet glass, said substitute comprising resinous material or organic material having a cellulose base commonly known as a plastic. Glass fibers of great fineness such as heretofore pointed out, when embedded in such material, greatly add to its strength and other desirable properties. The invention may be employed, for example, in the production of shatterproof glass for use in the manufacture of tumblers, bottles, dishes, flat glass articles and a great variety of other articles.

In Fig. 4 a mat of fabricated reinforcing material 20 is shown embedded in a sheet of plastic 21. It is possible to impregnate and coat such a mat with a plastic in a manner to produce a solid sheet of material. It is also possible to immerse or press the mat into the plastic so as to form a continuous sheet of reinforced shatter-proof glass. Other methods evidently may be used to produce the new product herein set forth.

In order to produce perfectly transparent composite material of the character herein set forth, it is important that the material be solid throughout, that is, free from all air or gas bubbles, interstitial spaces or voids, as any such bubbles or gas filled spaces will serve to retract and reflect the light rays the same as a solid material having a different index of refraction from the base material. Further, substantially smooth outer surfaces of the composite material are required for obtaining the desired transparency.

Fig. 5 is a view on an enlarged scale illustrating a material particularly adapted for use as an insulating material, made in accordance with the present invention. In this instance the glass fibers 22 which may be quite short, as, for example, having an average length of 1/16 of an inch more or less, are intermixed with or embedded in a transparent plastic body 23 such as heretofore described having substantially the same index of refraction as the glass fibers. The fibers serve in part as an electrical insulation and also provide a filler and strengthener for the plastic in which they are embedded. The lengths and diameters of the fibers evidently may be varied within wide limits depending upon the particular results desired.

Fig. 6 illustrates a specific application of my novel transparent composite material, here shown as used in making a tumbler 25 consisting of a transparent organic or plastic base material, having embedded therein glass wool or fibers 26 or the like which serve as a strengthener and filler. The glass fibers may be of great fineness as, for example, within a range of 3 to 10 microns in diameter and also preferably of considerable length as, for example, several inches. Such fibers have enormous tensile strength, far greater than glass of larger dimensions and at the same time are extremely flexible. Owing to these properties and also the relative nonstretchability of the fibers as compared with the plastic base, they greatly increase the strength and durability of the article. When a transparent plastic base is employed and the glass fibers have the same index of refraction, so that they are invisible, the tumbler is transparent, having a clear, uniform appearance. In this manner it is possible to produce relatively inexpensive tumblers or similar articles which have the desirable characteristics of glass articles and at the same time are relatively strong, tough, flexible, light in weight, and non-shatterable.

In the manufacture of a composite material such as herein disclosed, the glass fibers or other segregated or comminuted material may be embedded or incorporated in the plastic base material by one of the methods hereinbefore noted or by any other approved or conventional method. The composite material may then be blown or pressed in molds or fabricated by other known or conventional methods for forming articles of any desired shape. It is possible, for example, to form bottles, jars, tumblers and the like by blowing or expanding mold charges of the composite material within the molds by means of apparatus and methods similar to those used in the manufacture of blown glassware.

In regard to the selection of materials to be combined in accordance with my invention for producing transparent composite materials, it should be noted that ordinary glasses are compounds or mixtures of metal oxides in varying percentages, with no fixed formula, and variations in the percentages of ingredients result in corresponding variations in the index of refraction. In general, the index of refraction of a glass may be increased by the addition of basic oxides such as the oxides of lead, barium, bismuth and strontium, and to a lesser extent, calcium, magnesium, lithium, sodium and potassium. For example, in a soda lime glass, the addition of 6% CaO at the expense of $SiO_2$ will increase the index approximately .01. The addition of $SiO_2$ or $B_2O_3$ in appreciable amounts will decrease the index of refraction. The index of refraction of the plastics may also be altered but the modifying substance usually is specific for each plastic.

Among the plastics adapted for use in practicing my invention may be noted the following, namely, rubber, shellac, pyroxylin (known under trade names as Celluloid, Pyrolin, etc.), phenol formaldehyde resins (trade name Bakelite), casein, urea formaldehyde resins, thiourea resin, cellulose acetate, and vinyl and styrol types of plastics.

The methyl ester of methacrylic acid (more briefly, methacrylate) known in the trade as "Pontalite," is an example of a plastic which may have incorporated therein glass fibers or the like for producing a composite material which is highly transparent and brilliant and possesses many valuable properties and which is adapted for molding into complex shapes, machining, drilling, cutting, etc.

Polystyrene is another example of a synthetic resin well adapted for combination with a reinforcing material such as glass wool or the like, in the production of transparent articles. The polystyrene may be made by a polymerization process from styrene which is a limpid liquid. The glass fibers or fabrics to be combined therewith as a reinforcing material may be introduced into the liquid styrene. The latter may then be polymerized to produce a plastic polystyrene resin which while in a plastic condition may be molded or otherwise fabricated. Such plastic may be blown or pressed in molds by methods similar to those commonly employed in the manufacture of glassware.

In the following paragraphs I have given by way of example a number of glass compositions and plastics which have matched indices of refraction, that is to say, in each example, a glass having the same index of refraction as the specified plastic with which it is matched.

The index of refraction of resin derived from vinyl acetate is 1.466. The index may be increased by copolymerization with vinyl chloride. The resin may be matched with glasses of the following composition:

| | Per cent | | Per cent |
|---|---|---|---|
| $Na_2O$ | 5 | $K_2O$ | 8.0 |
| $SiO_2$ | 95 | $SiO_2$ | 92.0 |

Ethyl cellulose has an index of 1.47. The index may be increased by mixing with other substances such as wood rosin. With no added substances the index of the resin equals the indices of glasses of the following composition:

| | Per cent | | Per cent |
|---|---|---|---|
| $Na_2O$ | 7.5 | $K_2O$ | 12.0 |
| $SiO_2$ | 92.5 | $SiO_2$ | 88.0 |

Cellulose acetate has an index of refraction of 1.48 and may be matched with a glass of the following composition:

| | Per cent |
|---|---|
| $Na_2O$ | 8.0 |
| $CaO$ | 6.0 |
| $SiO_2$ | 86.0 |

Nitro cellulose possesses an index of refraction of 1.51 and may be matched with a glass of one of the following compositions:

| | Per cent | | Per cent | | Per cent |
|---|---|---|---|---|---|
| $Na_2O$ | 12.0 | $K_2O$ | 17.3 | $B_2O_3$ | 2.7 |
| $CaO$ | 10.0 | $CaO$ | 10.2 | $SiO_2$ | 71.1 |
| $SiO_2$ | 78.0 | $SiO_2$ | 72.5 | $K_2O$ | 18.8 |
| | | | | $CaO$ | 6.8 |
| | | | | $Al_2O_3$ | 0.3 |
| | | | | $AsO_3$ | 0.2 |

The index of the resin derived from vinyl chloride is 1.544. The index may be decreased by copolymerization with vinyl acetate. This resin may be matched with glasses of the following formulas:

| | Per cent | | Per cent | | Per cent |
|---|---|---|---|---|---|
| $CaO$ | 18.0 | $K_2O$ | 12.7 | $Na_2O$ | 16.6 |
| $MgO$ | 4.5 | $CaO$ | 22.4 | $CaO$ | 17.8 |
| $Al_2O_3$ | 13.5 | $SiO_2$ | 64.9 | $SiO_2$ | 65.6 |
| $SiO_2$ | 54.0 | | | | |
| $B_2O_3$ | 10.0 | | | | |

The index of refraction of RH–35 is 1.60. The index may be adjusted downward or upward with other suitable resins such as rosin. It may be matched with glasses of the following formulas:

| | Per cent | | Per cent |
|---|---|---|---|
| $Na_2O$ | 13.0 | $Na_2O$ | 20.8 |
| $PbO$ | 40.0 | $Bi_2O_3$ | 29.5 |
| $SiO_2$ | 47.0 | $SiO_2$ | 49.7 |

It will be understood that many glass compositions other than those above given and also other transparent bases may be matched for producing a transparent composite material such as herein set forth. Also, the invention is of a scope to cover the combination of materials other than those specified, in the production of transparent composite materials.

I claim:

1. A flexible, non-porous, transparent plastic organic material having the appearance of glass, and a plurality of attenuated glass fibers embedded in said plastic material to form a clear transparent body free from interstitial spaces or voids, said transparent glass fibers having a diameter less than 10 microns, the indices of refraction of said glass fibers and said plastic being the same, whereby the embedded glass fibers optically disappear.

2. An article of manufacture comprising a plastic molded to form an article of predetermined size and shape and having smooth surfaces, and a multiplicity of glass fibers interspersed through and embedded in said plastic, said fibers and said plastic being transparent and having the same index of refraction, whereby the said embedded fibers are rendered invisible.

3. A flexible, non-porous, transparent body which comprises a solid, plastic resinous material, and a multiplicity of attenuated glass fibers embedded in and dispersed through said body, said glass fibers having the same index of refraction as the transparent body whereby they are rendered invisible therein.

4. A flexible, non-porous, transparent body which comprises a solid, plastic, transparent, resinous material and a multiplicity of attenuated glass fibers having the same index of refraction as the resinous material embedded in and invisible in said plastic material and serving as a strengthening agent, said fibers having a diameter of less than ten microns.

5. A product of manufacture comprising a solid, transparent body, said body consisting of a base of transparent plastic, and a multiplicity of transparent glass fibers embedded in said base, the index of refraction of said fibers relative to that of said base material being such that the fibers are invisible.

6. An article of manufacture which comprises a woven fabric of transparent glass fibers and a non-porous, organic, transparent plastic material in which said fabric is embedded, and forming therewith a solid, transparent material free from interstitial spaces or voids, the indices of refraction of said glass and said plastic material being the same so that the glass fibers optically disappear.

7. An article of manufacture comprising a mat of transparent glass fibers, and a non-porous, transparent body of organic plastic material of predetermined conformation in which said fibers are embedded, the indices of refraction of said fibers and material being relatively such that the embedded fibers are invisible, said fibers being long and fine and adapted to serve as a strengthening agent.

8. A product of manufacture comprising a base of organic, non-porous, transparent plastic material, and inorganic transparent fibers embedded in said base, the indices of refraction of said fibers and said base being relatively such at room temperatures that embedded fibers are invisible.

GAMES SLAYTER.